(12) United States Patent
Pilskalns et al.

(10) Patent No.: US 10,604,253 B2
(45) Date of Patent: Mar. 31, 2020

(54) ROTOR ARM ASSEMBLY AND FITTING FOR UNMANNED AERIAL VEHICLE

(71) Applicant: Skyyfish, LLC, Missoula, MT (US)

(72) Inventors: Orest Jacob Pilskalns, Missoula, MT (US); Daniel Reed, Corvallis, MT (US)

( * ) Notice: Subject to any disclaimer, the term of this patent is extended or adjusted under 35 U.S.C. 154(b) by 460 days.

(21) Appl. No.: 15/390,222

(22) Filed: Dec. 23, 2016

(65) Prior Publication Data

US 2018/0178922 A1    Jun. 28, 2018

(51) Int. Cl.
   *B64C 39/02*    (2006.01)
(52) U.S. Cl.
   CPC ...... *B64C 39/024* (2013.01); *B64C 2201/027* (2013.01); *B64C 2201/042* (2013.01); *Y02T 50/62* (2013.01)
(58) Field of Classification Search
   CPC .............................................. B64C 2201/042
   See application file for complete search history.

(56) References Cited

U.S. PATENT DOCUMENTS

| | | | | | |
|---|---|---|---|---|---|
| 2,161,692 | A | * | 6/1939 | Andre | H01R 11/281 439/519 |
| 5,409,391 | A | * | 4/1995 | Raby | H01R 33/08 439/239 |
| 6,394,851 | B1 | * | 5/2002 | Paciorek | B60N 3/14 439/668 |
| 9,828,104 | B2 | * | 11/2017 | Ji | B64C 27/08 |
| 2002/0146931 | A1 | * | 10/2002 | Richmond | H01R 13/6453 439/488 |
| 2016/0327206 | A1 | * | 11/2016 | Yang | F16M 11/10 |
| 2016/0327847 | A1 | * | 11/2016 | Yang | B64D 47/08 |
| 2017/0002975 | A1 | * | 1/2017 | Yang | F16M 13/02 |
| 2017/0015418 | A1 | * | 1/2017 | Matus | B64C 39/024 |
| 2017/0139409 | A1 | * | 5/2017 | Clarke | B64C 39/024 |
| 2017/0217559 | A1 | * | 8/2017 | Peng | B64C 25/08 |
| 2018/0118322 | A1 | * | 5/2018 | Harris | B64C 1/063 |
| 2018/0141660 | A1 | * | 5/2018 | Matus | B64C 39/024 |
| 2018/0327090 | A1 | * | 11/2018 | De Chassey | A63H 27/12 |

FOREIGN PATENT DOCUMENTS

GB       2533354 A   *  6/2016   ........... H01R 13/405

* cited by examiner

*Primary Examiner* — Magdalena Topolski
(74) *Attorney, Agent, or Firm* — Cotman IP Law Group

(57) ABSTRACT

A rotor arm assembly has a mechanical alignment and electrical connector for fitting to an unmanned aerial vehicle (UAV). The UAV has a corresponding fitting for aligning the rotor arm assembly, making an electrical connection with it and retaining it in position. Such rotor arm assemblies are easily and quickly replaced due to their modular construction. UAVs with this construction are easily transported and stored.

8 Claims, 6 Drawing Sheets

ROTOR ARM ASSEMBLY AND FITTING FOR UNMANNED AERIAL VEHICLE

CROSS-REFERENCE TO RELATED APPLICATIONS

Reference is made to U.S. provisional patent application Ser. No. 62/127,369, filed on Mar. 3, 2015.

TECHNICAL FIELD

This application relates to unmanned aerial vehicles (UAV). More specifically, it relates to the modular construction of rotor arm assemblies and their fitting to a UAV.

BACKGROUND

UAVs are often bulky and therefore difficult to transport and store. It is not convenient to disassemble them because of the multitude of wires in them. Furthermore, when assembling a UAV, it is important that the assembled UAV be rigid and that various of its components are accurately aligned. The efficiency with which a UAV carries its payload depends on the weight of the payload.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention relates to a modular construction of and fitting for UAVs, in which the rotor arm assemblies of a UAV may be quickly detached and reattached. This enables the UAV to fit into or to be transported in a smaller container, i.e. one that is relatively small compared to the assembled size of the UAV. The main features of the fitting disclosed herein are that it provides a mechanical attachment, a mechanical alignment and an electrical connection to facilitate the removal and mounting of a rotor arm assembly as a module. In some cases, protective alignment protrusions from the male electrical connector may extend further than the electrical connection pins. Optionally, visual indicators may be included to show which rotor arm assembly goes into which fitting.

Embodiments of the modular construction and fitting disclosed herein for UAVs can provide one or more advantages. Such advantages include, for example, compact storage, compact transportation, rapid assembly and disassembly, ease of electrical connection, rigid connections between the arms and the body of the UAV, aligned connections between the arms and the body, and ease of maintenance without the arms being attached. Another advantage is that different sized motors can be readily used for different sized payloads in order to maximize lift efficiency, flight time and/or stability. The motor size can be changed within seconds rather than hours, and the use of optimized motors can improve flight duration by up to about 40%.

Disclosed herein is a rotor arm assembly for an unmanned aerial vehicle (UAV) comprising: a rotor arm having an inner end region and an outer end region; a first connector mounted to the inner end region of the rotor arm; and a second connector on an airframe of the UAV; wherein the first connector is configured to mate and unmate with the second connector.

The rotor arm assembly may further comprise: a motor mounted on the outer end region of the rotor arm; and a rotor attached to the motor; wherein the motor is electrically connected to the first connector.

The rotor arm assembly may still further comprise: an electrical pin and a protrusion on the second connector; and a corresponding electrical socket on the first connector configured to mate and unmate with the electrical pin on the second connector, the electrical socket having a recess configured to accept the corresponding protrusion on the second connector, wherein the protrusion is configured to prevent mating of the first and second connectors unless the first and second connectors are in a correct orientation with respect to each other.

Also disclosed herein is an unmanned aerial vehicle (UAV) comprising: a rotor arm assembly; and a fitting on an airframe of the UAV being configured to removably retain the rotor arm assembly on the airframe. The rotor arm assembly comprises: a rotor arm having an inner end region and an outer end region; a first connector mounted to the inner end region of the rotor arm; and a second connector on the airframe of the UAV, wherein the first connector is configured to mate and unmate with the second connector. The fitting comprises: a guide assembly configured to direct the rotor arm towards the second connector; a connector assembly comprising the second connector, wherein the connector assembly is aligned with the guide assembly; and a clamp to retain the rotor arm assembly in position when the first and second connectors are mated.

BRIEF DESCRIPTION OF DRAWINGS

The following drawings illustrate embodiments of the invention, which should not be construed as restricting the scope of the invention in any way.

DESCRIPTION

A. Glossary

The term "airframe" is synonymous with "body" and refers to the central, main portion of a UAV, to which various functional modules of the UAV are attached either externally or internally. Such modules may, for example, include a flight controller, electronic speed controllers, one or more batteries, rotor arm assemblies, a transmitter, a receiver, etc.

An "electronic speed controller" (ESC) is an electronic module in a UAV that controls the speed of a motor based on an instruction received from the flight controller.

A "flight controller" is an electronic module in a UAV which is used to control the flight of the UAV.

The term "module" can refer to any component in this invention and to any of the features of the invention without limitation. A module may be a hardware module, which may also include one or more of software and firmware.

An "unmanned aerial vehicle" (UAV) is a powered flying device that is remotely or self controlled, without a human pilot onboard. They are often referred to as drones.

B. Exemplary Embodiments

Figure 1:
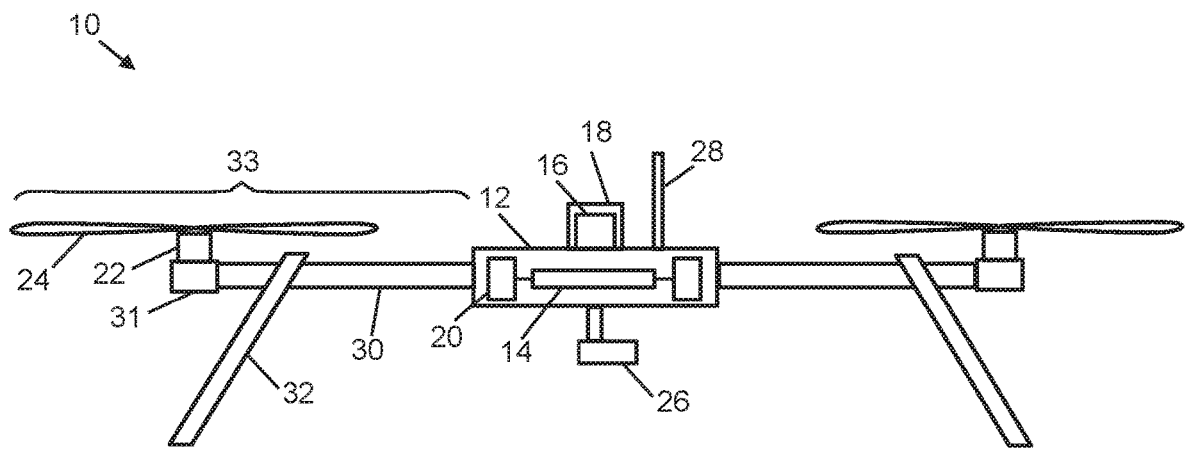
FIG. 1 is schematic side view of an example of a multi-rotor unmanned aerial vehicle according to an embodiment of the present invention.

Referring to FIG. 1, a multi-rotor UAV 10 typically includes an airframe (or body) 12, which holds the flight controller 14, battery 16, battery holder 18 and one electronic speed controller (ESC) 20 per motor 22. The UAV 10 also includes rotor 24 attached to each motor 22. The airframe 12 may carry a camera 26 or other payload or tool, such as an infra-red detector or spray dispenser. Commands may be transmitted wirelessly to the UAV 10 via an antenna 28. The UAV 10 further includes rotor arms 30 (or booms) which are removably attached to the airframe 12. Rotor arms 30 may be made from carbon fiber, for example, or other suitable lightweight and rigid material. There is one arm 30 per motor 22, which in a typical example such as this amounts to four motors. The motor 22 may be mounted to the outer end of the rotor arm 30 indirectly using a motor mounting block 31 or otherwise. Landing gear 32 is attached to each rotor arm 30. The landing gear 32 may or may not be readily removable from the rotor arm 30 depending on the embodiment.

The rotor arm 30, mounting block 31, motor 22, rotor 24 and landing gear 32 may be considered to form a rotor arm assembly 33, which, in accordance with an embodiment of the present invention, is readily removable from and reconnectable to the airframe 12. Such a modular rotor arm assembly 33 can be used to fit into different UAVs of the same type or of a different type. For example, it may fit into UAVs that need only three rotor arms, or UAVs that need six or eight. Spare rotor arm assemblies 33 could be carried conveniently in case one gets damaged or fails during use.

Different rotor arm assemblies may be made for, and included with, the same UAV. For example, different rotor arm assemblies may have different motor sizes or powers, different rotor sizes and/or different arm lengths.

The battery 16 is connected to each ESC 20, each ESC in turn controlling the amount of power supplied to each motor 22 respectively. The flight controller 14 sends instructions to each ESC 20, to provide instructions for the amount of power each motor 22 should receive. Such an instruction may be, for example, a number corresponding to the required revolutions per minute (RPM). In this example, the flight controller 14 in the multi-rotor UAV 10 sends messages to four ESCs 20, where each ESC is paired with one motor 22 to control the speed of it, which directly relates to the speed of the rotor 24 attached to it. By manipulating the speed of each motor 22, the flight controller 14 can command the UAV 10 to hover and move.

Running along each rotor arm 30 are at least three wires for the three phases that run each motor 22, in the case where three-phase motors are used. If, in other embodiments, the UAV 10 has two motors 22 on each arm 30 then six wires would be required.

Figure 2:
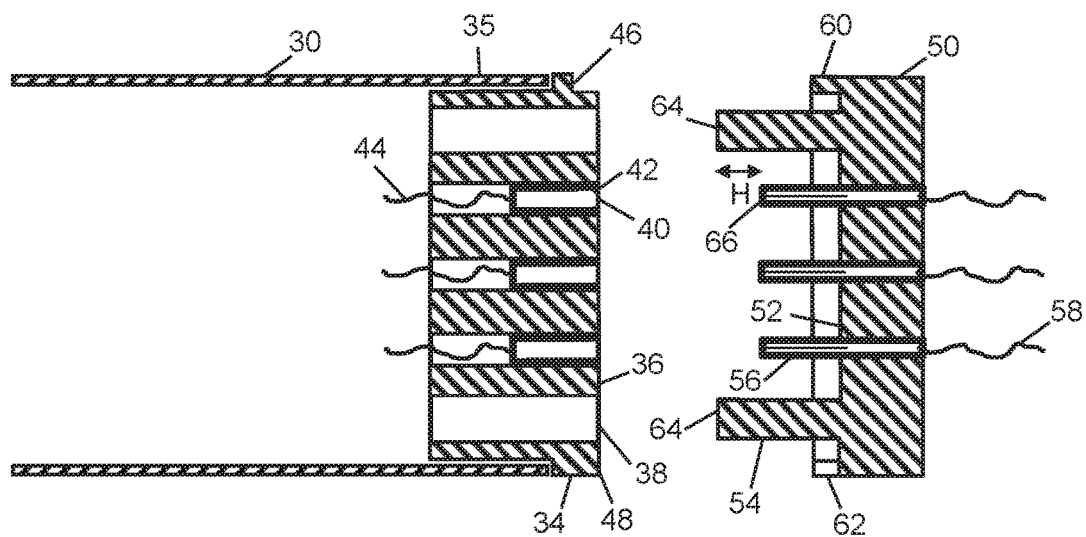
FIG. 2 is a schematic cross-sectional diagram of the inner end of a rotor arm to which a female electrical connector is attached, and a male electrical connector to which the inner end of the arm connects, according to an embodiment of the invention.

Referring to FIG. 2, the rotor arm assembly 33 also includes an exemplary female electrical connector 34 that is mounted at the inner end region 35 of a rotor arm 30, the inner end being the end that fits to the airframe 12. The inner end region 35 may be or may include the actual end of the rotor arm 30. In order for the construction of the UAV 10 to be modular, the electrical connections between each ESC 20 on the airframe 12 of the UAV and the corresponding motors 22 at the outer ends of the rotor arms 30 are readily disconnectable.

The electrical connector 34 is a female connector having a front face 36 and alignment holes, recesses or apertures 38. Holes may be blind or through-holes. Female connector 34 also has openings 40 into each of which an electrical socket 42 is fitted. The sockets may be mounted flush with the front face 36 of the connector 34 or they may be set back from the front face. The sockets 42 are connected to wires 44 that are in turn connected to the motor 22 at the outer end of the rotor arm 30. The female connector 34 has an optional step 46 cut out from around the majority of its circumference. At one or more locations 48 of the circumference the step may be filled in or, in other words, absent, in order to provide an alignment point for assisting with axial rotational alignment of the rotor arm 30 and female connector 34 with the corresponding male connector 50 of the rotor arm assembly 33, which is mounted on the airframe 12 of the UAV 10.

The male electrical connector 50 has a front surface 52, which butts up to front surface 36 of the female connector 34 when the rotor arm 30 is inserted with the correct alignment into the UAV 10. The male connector 50 also has protrusions 54 and split-pin electrical connectors 56 connected to wires 58, which in turn are connected to an ESC 20. The male connector 50 has an optional rim 60 around the majority of its circumference, with one or more gaps 62. The rim 60 and gaps 62 engage with the corresponding step 46 and unstepped edge 48 when the male connector 50 and female connector 34 are fully connected or mated to each other, i.e. when the front face 36 of the female connector butts up against the front face 52 of the male connector. The protrusions 54 on the male connector 50 are shaped to be insertable into holes 38 in the female connector, and have at least one larger cross-sectional dimension than the holes 40. This is so that the protrusions so not enter or damage the sockets 42. It is also so that, as the rotor arm 30 is being inserted into the UAV 10, the front surfaces 64 of the protrusions 54 will not be able to enter the alignment holes 38 due to rotational or off-axis misalignment between the rotor arm and the male connector 50 mounted on the UAV. Instead, the front surfaces 64 of the protrusions 54 will butt up against the front surface 36 of the female connector 34, until the rotor arm 30 has been laterally aligned and rotated about its axis to the correct alignment position. This prevents the electrical sockets 42 from inadvertent damage.

The front surfaces 66 of the split-pins 56 are set behind the front surfaces 64 of the protrusions 54 by a distance H. This prevents the split pins 56 from contacting the female connector 34 until the protrusions 54 are aligned with, and at least partially inserted into, the corresponding holes 38. When the protrusions 54 are aligned with the holes 38, the connectors 34, 50 can be brought closer together with assurance that the split-pins 56 are aligned with the sockets 42. As the connectors 34, 50 are then brought closer together, the protrusions 54 start to enter alignment holes 38, without the pins 56 yet making contact with the connector 34. Eventually, as the connectors are brought still closer together, the pins 56 enter the holes 40 and at the same time (or later, depending on the depth of the sockets 42), make electrical contact with the sockets. The two connectors 34, 50 can be pushed together until their front surfaces 36, 52 touch, which is when the connectors can be considered to be fully mated. This arrangement prevents accidental damage to the split-pins 56 as the rotor arm 30 is being inserted into the UAV 10. The dimensions of the split-pins 56 are such that they make a snug, press fit inside the sockets 42.

Other shapes, sizes and relative dimensions are also possible for the pins 56 and sockets 42, and for the protrusions 54 and holes 38. In some embodiments, the pins 56 may rotate and wobble within the male connector 50, or otherwise float, while still being secure. This allows the pins 56 to self-align to a certain extent. The pins 50 may have rounded front surfaces 66. Pins 56 and/or sockets 42 may be tapered, as may be the protrusions 54 and the holes 38.

Figure 3:
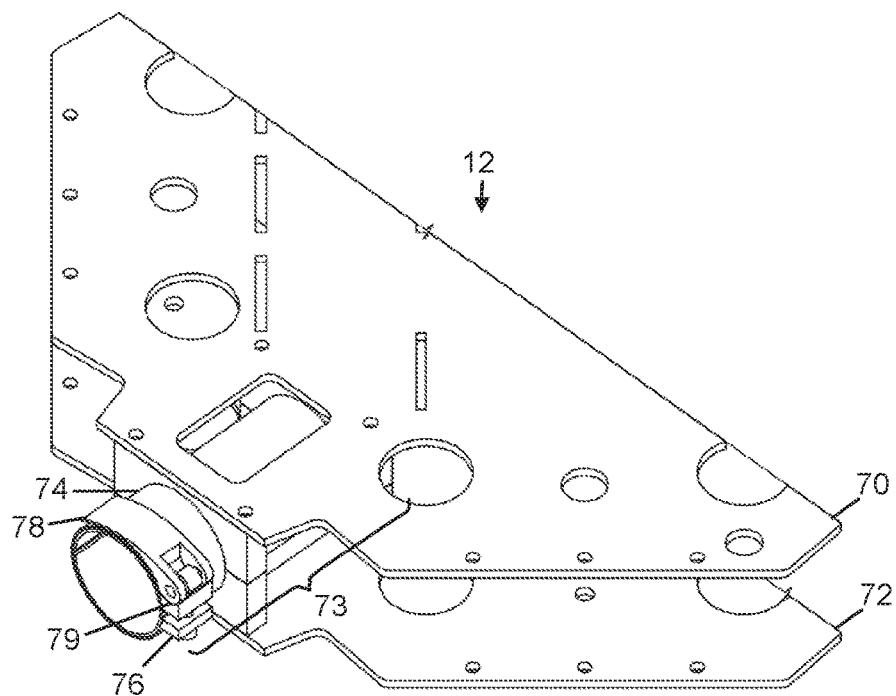
FIG. 3 shows top and bottom plates of a body of a UAV to which a fitting is attached according to an embodiment of the present invention.

Referring to FIG. 3, a portion of the airframe 12 is shown, in which the top plate 70 of the airframe and the bottom plate 72 of the airframe can be seen. Between these two plates 70, 72, the airframe 12 has a guide assembly 73 mounted for receiving the arm 30 of a rotor arm assembly 33. There is one guide assembly 73 for each rotor arm assembly 33. The guide assembly 73 includes a cylindrical guide tube 74, which may be of a split-ring type construction so that it can be squeezed or compressed onto an inserted rotor arm 30 to hold it in position. The guide tube 74 may be made from carbon fiber, aluminum or titanium, for example. Around the guide tube 74 is a clamp 76 of the cam type. When the arm 78 of the clamp is closed, a cam 79 on the end of the clamp arm causes the clamp 76 to tighten around the guide tube 74. This in turn tightens the guide tube 74 onto the rotor arm 30. Here, the clamp 76 is shown in the closed, or locked, position, with its arm 78 down towards the guide tube 74.

Figure 4:
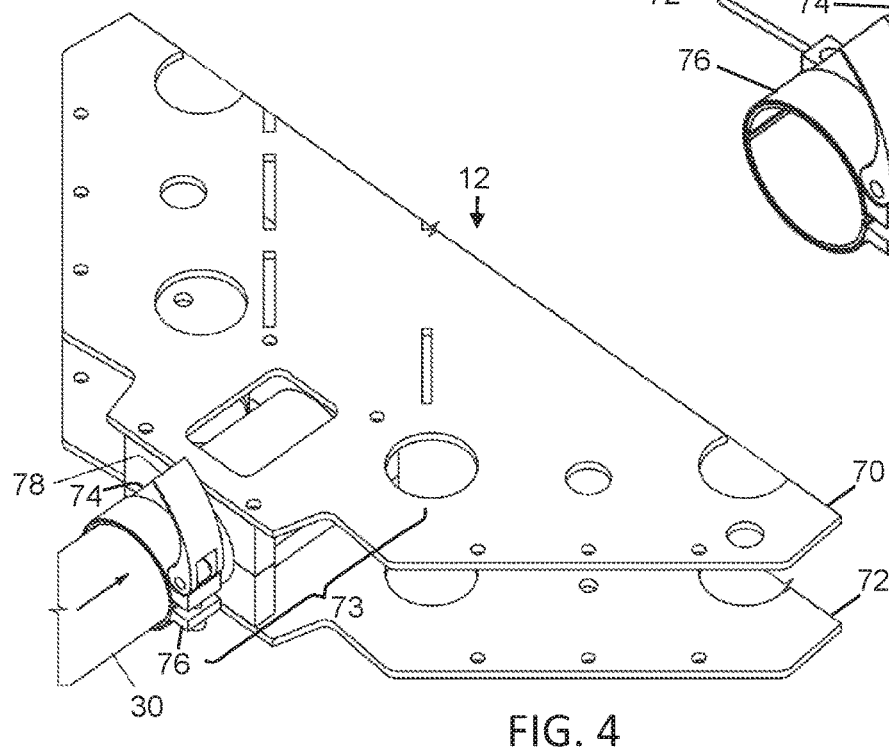
FIG. 4 shows the body and fitting of FIG. 3 with a rotor arm inserted into the fitting.

Referring to FIG. 4, a rotor arm 30 is shown inserted into the guide tube 74. The outer diameter of the rotor arm 30 is slightly smaller than the natural, uncompressed inner diameter of the guide tube 74. The clamp 76 is in the open position, with the clamp arm 78 rotated away from the guide tube 74. This permits the rotor arm 30 to slide freely in and out of the guide tube 74. As the rotor arm 30 is pushed into the guide tube 74, the female electrical connector 34 at the inner end 35 of the rotor arm 30 is directed towards and ultimately engages with the male electrical connector 50 (not visible here) mounted on the airframe 12. When inserting the rotor arm 30, it may be necessary to rotate it on its axis one way or another in order to align the mechanical alignment features (holes 38 and protrusions 54), which serve both as mechanical alignments for the rotor arm assembly 33 and for the electrical connections (sockets 42 and split-pins 56). Visual markings on the rotor arm 30 and the guide tube 74 or clamp 76, or elsewhere on the guide assembly 73, may be added to assist the user in aligning the rotor arm when inserting it, and to indicate that the rotor arm has been fully and properly inserted. When the rotor arm 30 has been fully inserted, the arm 78 can be moved towards the guide tube 74 to close clamp 76 in order to retain the rotor arm in position. The clamp 76 may be attached to the airframe 12 with fasteners, or it may be attached to the guide tube 74.

Figure 5:
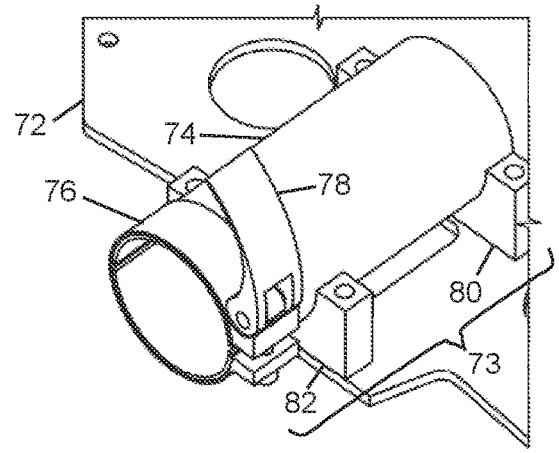
FIG. 5 shows components of the fitting of FIGS. 3 and 4 on the bottom plate of a UAV body, according to an embodiment of the invention.

FIG. 5 shows detail of the guide assembly 73 and in particular how the guide tube 74 is attached to the airframe 12, via two C-shaped cradles 80, 82 mounted to the bottom plate 72 of the airframe. Although not shown in this figure, there are two further C-shaped cradles that can be screwed onto the tops of the cradles 80, 82 shown in order to form a clamping system that rigidly holds the guide tube 74 onto the bottom plate 72 of the airframe 12. The length of the guide tube 74 should be sufficient to align and maintain the inserted rotor arm 30 pointing at the correct angle in relation to the airframe 12. As such, the tolerance of the inner dimensions of the guide tube 74 and the outer dimensions of the rotor arms 30 should be chosen carefully in order that the guide assembly 73 can hold the rotor arm securely and firmly so as to maintain adequate rigidity between the rotor arms and the airframe 12. It is important to maintain such rigidity because of the amount of torque generated by the force of the motors 22 across the length of the rotor arms 30 as measured from the airframe 12. The cam-style clamp 76, here with open arm 78, may include a tension control limiter to prevent excessive clamping force on the rotor arms 30 that are inserted into the guide tube 74. The guide tube 74 serves the dual purposes of providing a rigid interface between the rotor arms 30 and the airframe 12 and providing a guide for directing the inner end 35 of the rotor arm towards the electrical connector 50 on the airframe.

Figure 6:
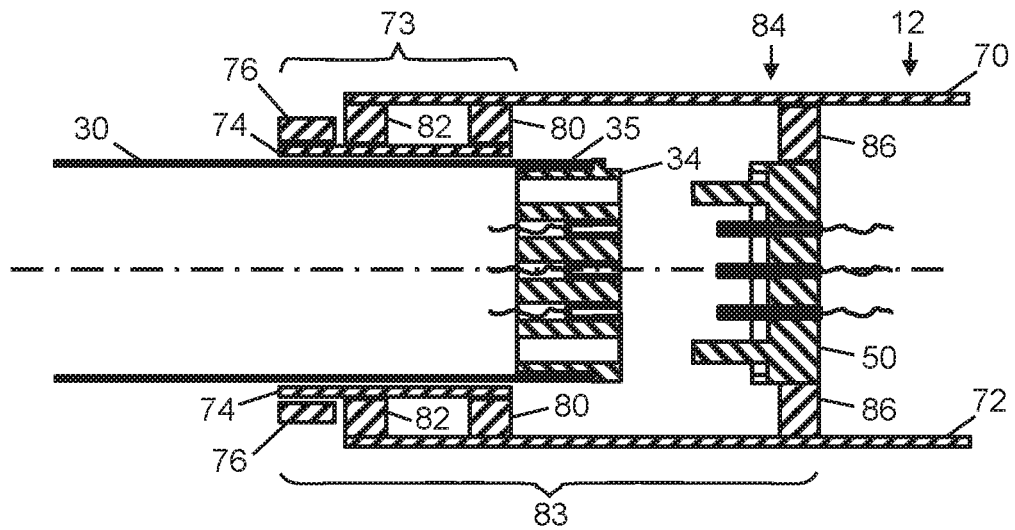
FIG. 6 shows a schematic cross-sectional view of a fitting including a guide assembly and connector assembly, with a rotor arm inserted into a guide tube of the connector assembly, according to an embodiment of the invention.

FIG. 6 shows a rotor arm 30 part-way inserted into fitting 83 of airframe 12. The fitting 83 includes the guide assembly 73 and a connector assembly 84, both mounted to the airframe 12 in axial alignment with each other. The rotor arm 30 is shown projecting through the guide assembly 73, with the female electrical connector 34 not yet making electrical contact with the male connector 50 in the connector assembly 84. The connector assembly 84 includes male connector 50 and mounting cradles 86 for attaching the male connector to the airframe 12. The guide tube 74 is mounted in C-shaped cradles 80, 82 that are fixed between the upper plate 70 and lower plate 72 of the airframe 12. Clamp 76 is shown around the guide tube 74. Female connector 34 is shown mounted in the inner end region 35 of the rotor arm 30. Male connector 50 is attached to C-shaped cradles 86 which are mounted between the upper plate 70 and lower plate 72 of the airframe 12. Top and bottom cradles 80, 82, 86 may be screwed respectively to the top and bottom plates 70, 72 of the airframe 12 and/or to each other. After the rotor arm 30 has been fully inserted into the fitting 83, the clamp 76 can be tightened around the guide tube 74 to hold the rotor arm firmly in place. The male connector 50 is mounted in the connector assembly 84 on the airframe 12 for additional protection of the pins 56 compared to if the male connector were attached to the rotor arm assembly 33.

In other embodiments, the fitting 83 may be made as a single unit that attaches to the airframe. For example, cradles 80, 82, 86 and guide tube 74 (or other equivalent components) may be connected and made from a single piece of material, such as metal. This would makes the entire UAV lighter and also stronger by providing stability to the airframe 12.

Figure 7:
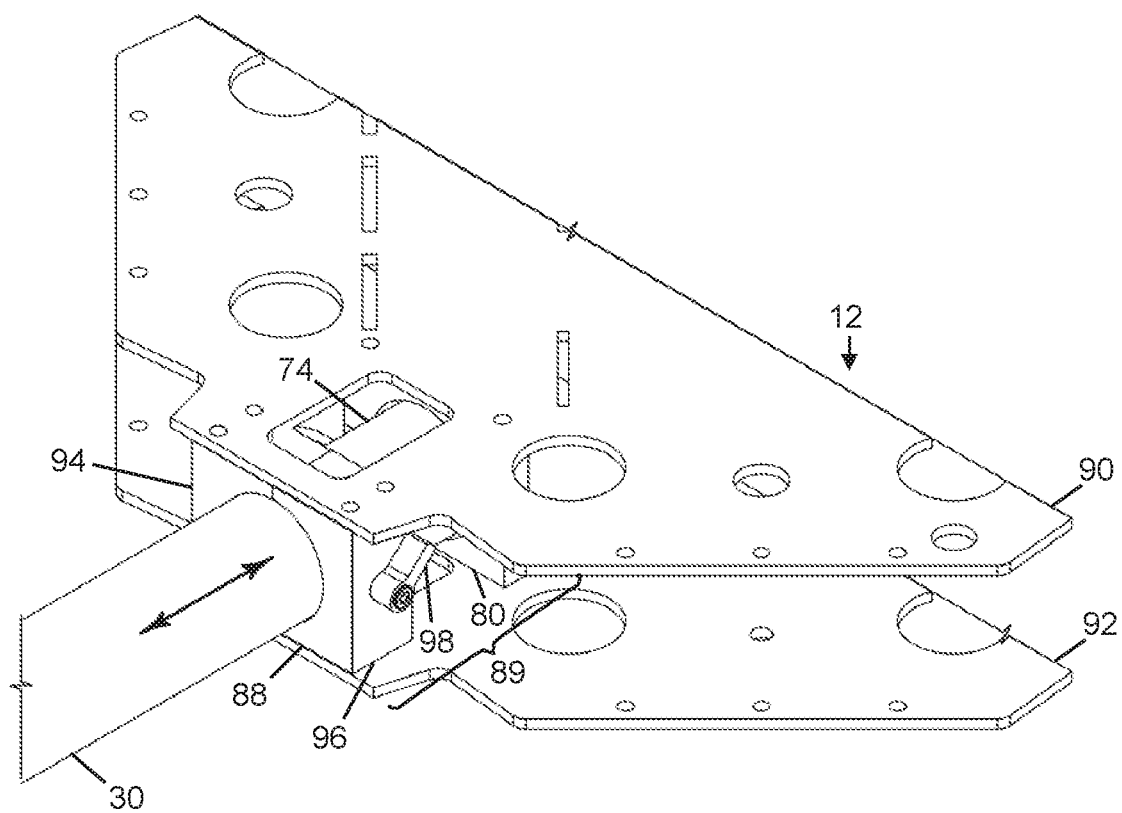
FIG. 7 shows top and bottom plates of a body of a UAV to which an alternate guide assembly is attached, according to an embodiment of the present invention.

FIG. 7 shows, in an alternate embodiment, a lever operated clamp 88 for an alternate guide assembly 89 mounted between top plate 90 and bottom plate 92 of the airframe 12. The left hand side 94 and the right hand side 96 of the clamp are fixed to the airframe 12, and are used to provide a locating surface for the guide tube 74, which guides the rotor arm 30 that passes inside the guide tube. When the lever 98 is operated, it moves an internal pressure pad (not visible) in the right hand side 96 of the clamp 88 to the left and right, allowing it to respectively squeeze or release pressure from the guide tube 74. The inner end of the guide tube 74 is supported by C-shaped cradles 80.

Figure 8:
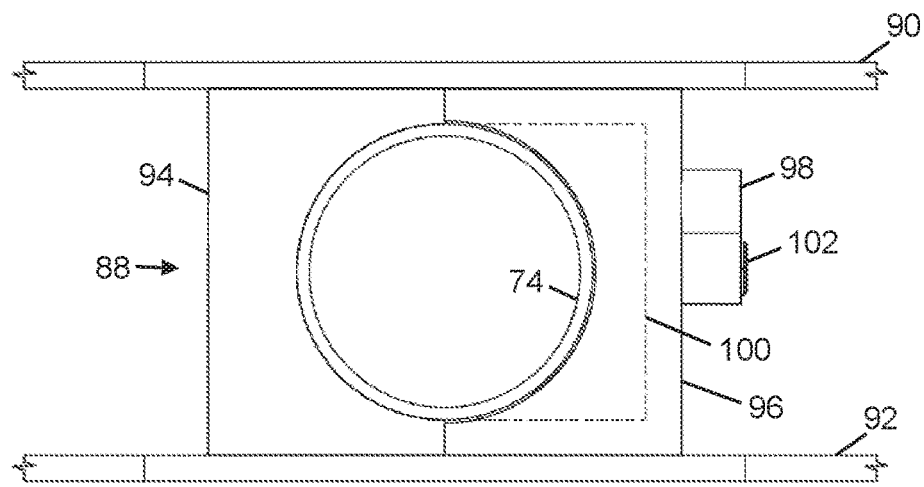
FIG. 8 shows a front view of the alternate guide assembly of FIG. 7.
Figure 9:
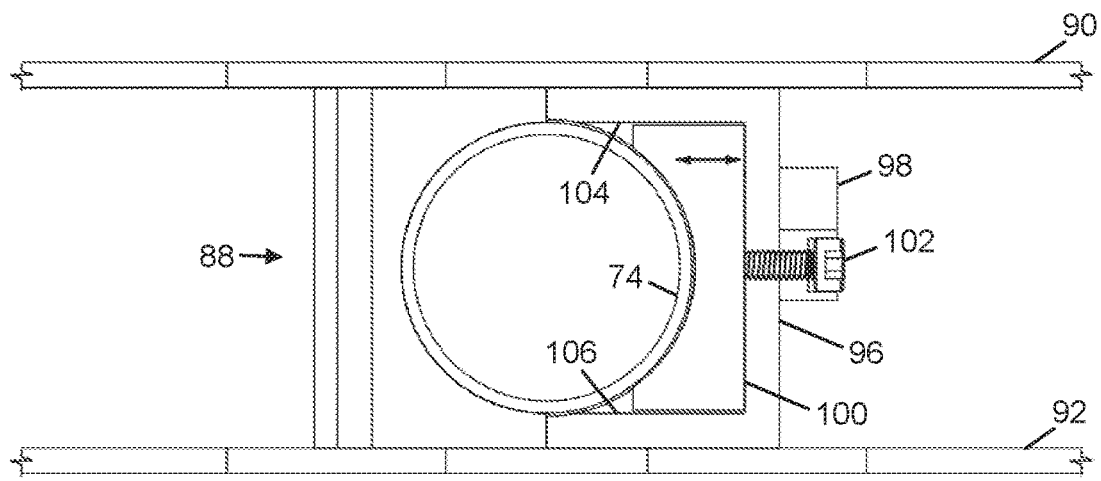
FIG. 9 shows a cross-sectional view of the alternate guide assembly of FIG. 7, taken along section A-A of FIG. 10.
Figure 10:
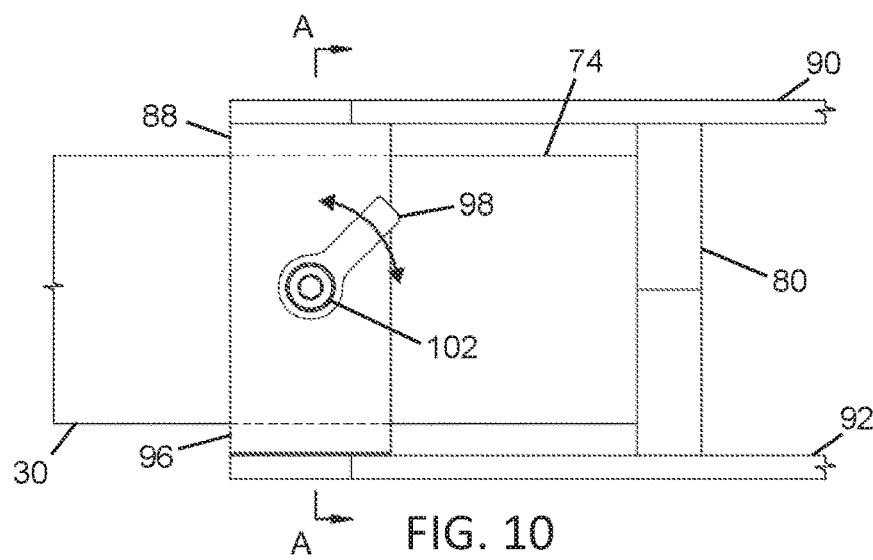
FIG. 10 shows a side view of the alternate guide assembly of FIG. 7.

FIG. 8 shows a front view of the alternate clamp 88 of FIG. 7, located between top plate 90 and bottom plate 92 of the airframe 12. The internal, adjustable pressure pad 100, located inside the right hand side 96 of the clamp 88, is activated by the lever 98. As the lever 98 is turned, it turns a screw 102 that pushes on the pressure pad 100, which presses on guide tube 74. The sectional view in FIG. 9 shows how the pressure pad 100 of the clamp 88 is guided along top inner surface 104 and bottom inner surface 106 of the right hand side 96 of the clamp. FIG. 10 is a side view of the lever-style clamping mechanism 88, with a rotor arm 30 inserted. A C-shaped cradle type mount 80 (as also shown in FIG. 5) is used for securing the inner end of the guide tube 74, while clamp 88 supports the outer end. A similar cradle type support (84, FIG. 6) is also used to mount the male electrical connector to the airframe 12.

Figure 11:
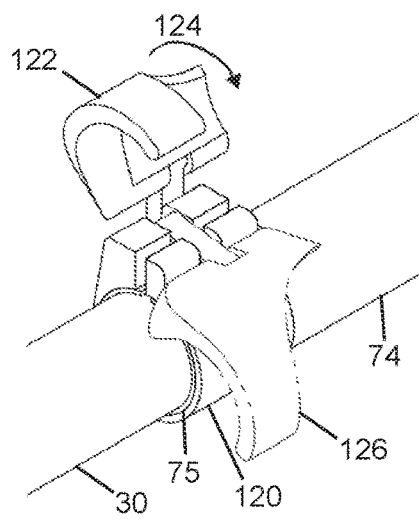
FIGS. 11-15 show various views of a compression type clamp in various different positions, according to an embodiment of the present invention.
Figure 12:
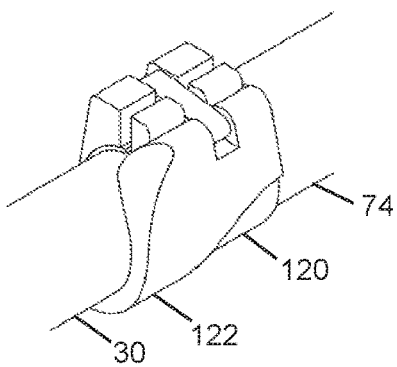
Figure 13:
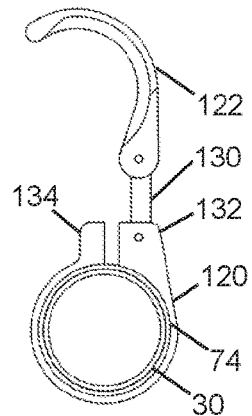
Figure 14:
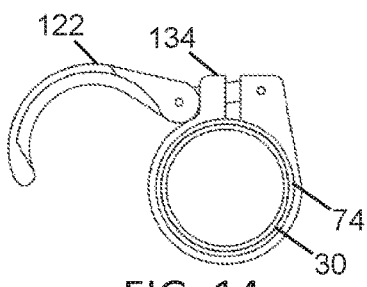
Figure 15:
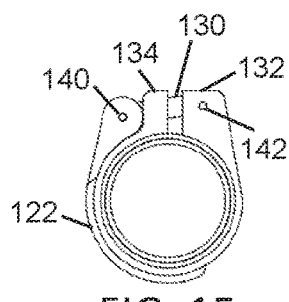

FIG. 11 shows a compression type clamp 120 used as part of a fitting 83 in an alternate embodiment of the invention. The compression clamp 120 is located around the outside of the guide tube 74, into which the rotor arm 30 is inserted. The clamp 120 is aligned with the outer end 75 of the guide tube 74. The guide tube 74 is mounted onto the airframe 12, as is a male electrical connector or plug (not shown here). The clamp handle 122 is shown in the fully open position (solid lines) and is moved in the direction of the arrow 124 to the half open position 126 (dotted lines). FIG. 12 shows the compression clamp 120 in the fully closed position, in which the handle 122 is shown positioned inwards as far as possible. FIG. 13 is an end view of the compression clamp 120 in the fully open position, showing its attachment arm 130 that enables a compression fit between the clamp handle 122 and the clamp body 120. When the clamp handle 122 is closed, it forces the two shoulders 132, 134 of the clamp together, pressing on guide tube 74, which in turn presses on rotor arm 30. FIG. 14 is an end view of the compression clamp 120 in the half closed position, showing the clamp handle 122 engaging with shoulder 134 of the clamp. FIG. 15 shows the compression clamp 120 in the fully closed position, with the handle 122 close in to the clamp. The press fit pins 140, 142, which provide articulation of the handle 122 and arm 130, are indicated.

Figure 16:
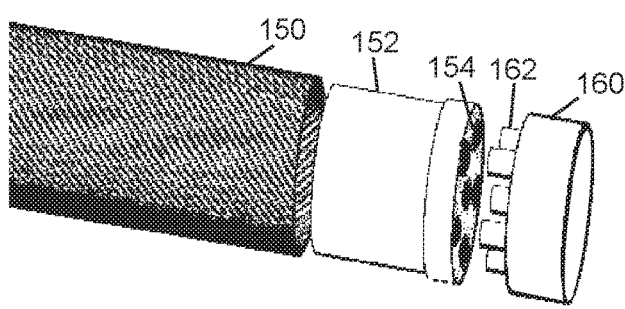
FIG. 16 is an exploded view of a portion of a rotor arm with an alternate female electrical connector at its end, and a male electrical connector to which the arm connects, according to an embodiment of the invention.

Referring to FIG. 16, an alternate embodiment of a rotor arm 150 is shown. A female electrical connector 152 is shown that is mounted at the inner end of each rotor arm 150, the inner end being the end that fits to the airframe 12. The female electrical connector 150 has multiple sockets 154 and connects to and disconnects from a corresponding male connector 160 mounted on the airframe 12 of the UAV 10. The connector 160 is, for example a 6 round electrical connector, having 6 connector pins 162. The arrangement of the pins 162 on the male connector 160 and the corresponding sockets 154 on the female connector 152 allows for only one mating orientation of the connectors and so the rotor arm 150 will only fit properly into the airframe 12 one way. When inserting the rotor arm 150, it may be necessary to rotate it on its axis one way or the other in order to align the electrical connections 154, 162. In this embodiment, the electrical pins themselves, together with their corresponding sockets, serve to both mechanically align the rotor arm to the male connector and make the required electrical connections. The connectors are ideally strong and robust so that the rotor arm 150 can be plugged in and unplugged many times without any connections breaking or becoming loose. The arrangement of the pins 162 and the corresponding sockets 154 may be asymmetric or may comprise one or more pins (and corresponding sockets) having a different diameter or cross-sectional form to other pins (and corresponding sockets).

Figure 17:
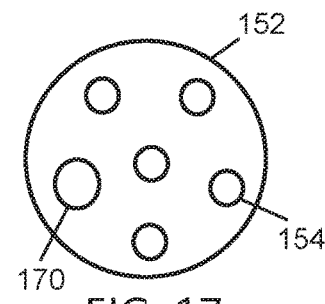
FIG. 17 is an end view of the rotor arm with the alternate female electrical connector, according to an embodiment of the invention.

FIG. 17 is an example in which one socket 170 in the female connector 152 is larger in diameter than the other sockets 154. The larger socket 170 therefore acts as a recess to accept a corresponding larger diameter pin on the male connector 160, the larger diameter pin acting as a protrusion for mechanical alignment, as well as an electrical connection. This arrangement ensures that the rotor arm 30 can only be connected one way. Note that, regarding relative pin dimensions, the end view of the corresponding male connector 160 is the same as FIG. 17.

Further Variations

The clamps may be attached to the guide tube immediately outside the airframe or within it, in which case access to each clamp may be via an access hole in the top plate of the airframe. Other access holes may also be present in the airframe 12 for viewing the connectors 34, 50 as they mate.

Figure 18:
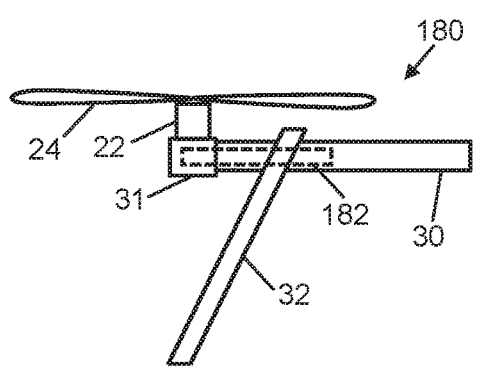
FIG. 18 is a view of an alternate embodiment of the rotor arm assembly in which a battery is included.

In other embodiments within the purview of the present invention, for example as in FIG. 18, the rotor arm assemblies 180 may each include a battery 182 for its corresponding motor 22. In this configuration, there will be fewer electrical connections needed, as only control information will be needed to be supplied through the rotor arms and not power. For example, in some embodiments, only one or two electrical connectors may be needed inside each arm. There may still be a battery mounted on the body of the UAV to power the flight controller and other components, for example. In such embodiments, the spare electrical connectors at the inner ends of the rotor arms may be used to charge the batteries inside the rotor arms, either when the arm assemblies have been removed from the UAV or when they are still attached.

A further advantage of physically moving some or all of the mass outwards into the arms (e.g. by moving the batteries there) is that it increases the moment of inertia of the UAV, which makes for greater rotational stability (i.e. reducing yaw/roll/pitch), without any overall increase of the mass of the UAV. Further still, there would be no need for a power distribution board in the UAV, which would be typical for single battery UAVs or even dual battery UAVs.

Figure 19:
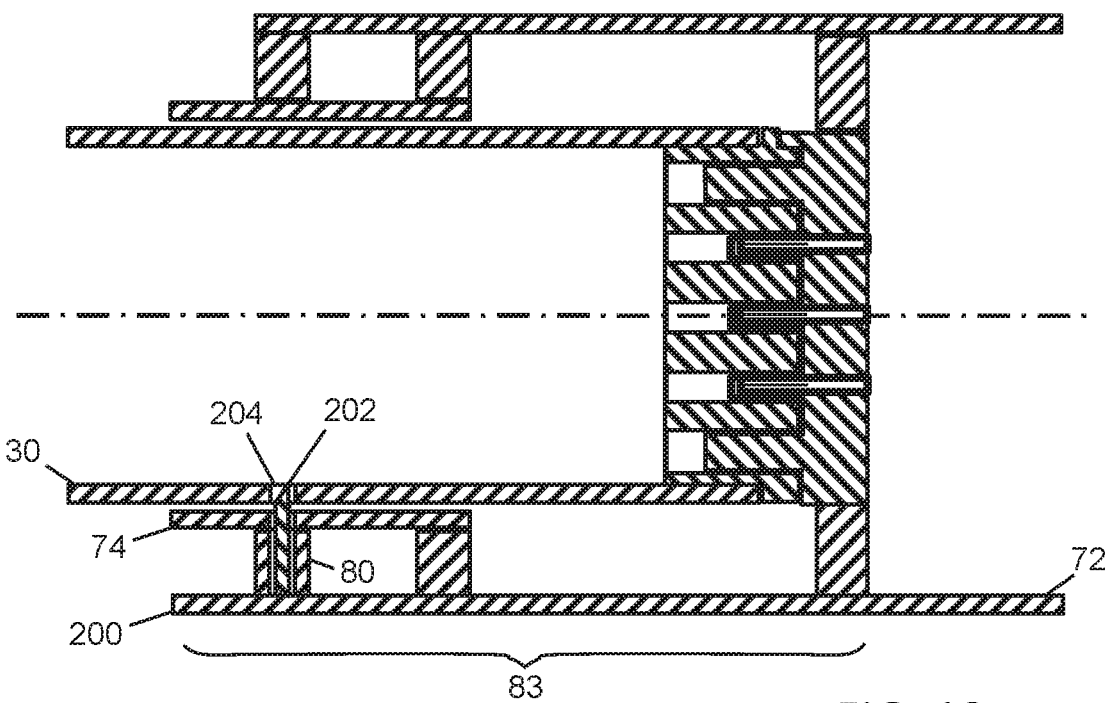
FIG. 19 is a sectional view of an end of a rotor arm inserted fully into its fitting and locked into position with a pin.
Figure 20:
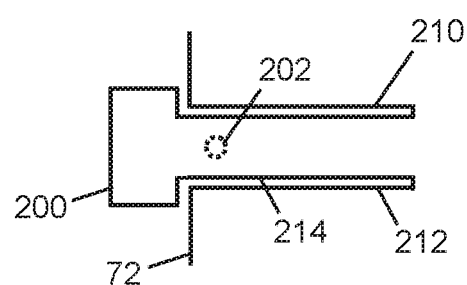
FIG. 20 shows a view of the underside of the bottom plate of the airframe that incorporates a finger carrying a locking pin for the rotor arm assembly.

The rotor arm 30 and fitting 83 may be configured with a safety device to prevent the rotor arm assembly from inadvertently falling out of the fitting 83. Referring to FIGS. 19 and 20, the bottom plate 72 of the airframe is cut at locations 210 and 212 and extended to form a tab 200 at the end of a finger 214. A locking pin 202 is mounted on the finger 214 that is formed between the cuts 210, 212. The locking pin 202 is shown with the rotor arm 30 fully inserted into the fitting 83. In this position, the locking pin 202 passes through a hole 204 in the rotor arm 30, and corresponding holes in the cradle 80 and guide tube 74. The top of the locking pin 202 has an angled surface that allows the rotor arm assembly to push it downwards as the assembly is pushed into the fitting 83. When the hole 204 in the rotor arm 30 aligns with the locking pin 202, the locking pin springs upwards into the hole and effectively locks the rotor arm in a position where the female connector 34 and male connector 50 are fully mated. The tab 200 can be pushed downwards against the inherent spring force of the finger 214 in order to move the locking pin 202 downwards so that the rotor arm assembly is unlocked and can be released, provided that the clamp 76 is loosened.

The locking pin 202 clicks into place when the rotor arm 30 is inserted fully into the fitting 83. It also provides some haptic feedback because the clicking action of the locking pin 202 can be felt. Also, the locking pin 202 provides some audible feedback. The locking pin 202 may project into or a few millimeters through the wall of the rotor arm 30. The presence of the locking pin 202 ensures that the rotor arm 30 is fully inserted and that it cannot be removed without depressing the tab 200. It also ensures that the electrical connections are solid.

In some embodiments, if one or more of the rotor arm assemblies are not interchangeable on the same UAV, then each rotor arm assembly and its corresponding fitting may have color-coded visual markings to indicate which rotor arm fits to which fitting.

In some embodiments, there may be additional electronic circuitry in each arm, and/or in the body of the UAV, to show that the arms are correctly seated by illuminating an LED (light emitting diode). The LED may be on the rotor arm or on the body of the UAV.

Other types of mechanical and/or electrical connectors can be used in other embodiments. The main requirements are that there be a mechanical alignment feature so that the rotor arms cannot be connected incorrectly; a strong mechanical clamping device sufficient to maintain rigidity in the structure of the UAV when the rotor arms are attached; an electrical connection; and the ability to quickly attach and release the rotor arms to and from the airframe. The landing gear may be attachable to the rotor arms using locking pins that are similar to the ones that may be used to lock the rotor arms into the airframe. The same lock-pin interface can be applied to the under mounted camera/sensor gimbal assembly or any other mounted electronics, no matter the location.

In general, unless otherwise indicated, singular elements may be in the plural and vice versa with no loss of generality. The gender of the electrical connectors may be switched. The cross-sectional shape of the rotor arms may be different, such as a square section. Motors with a different number of phases may be used.

Although the present invention has been illustrated principally in relation to rotor arm assemblies for typically small multi-rotor UAVs, it has application in respect of other types of UAV. It also has application to other components on the UAV. For example, a communications array or other module in the UAV may use the type of connection described in relation to FIG. 2. The airframe 12 could act as a motherboard to which the various component or modules attach using this type of connection, allowing for rapid exchange of components or modules. The motor 22, rotor 24 and motor mounting block 31 may form a sub-assembly that is connectable to and disconnectable from the outer end of the rotor arm 30 using the type of connection shown in FIG. 2. Rotor arms 30 of different lengths may be switched in and out.

Throughout the description, specific details have been set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

It will be clear to one having skill in the art that variations to the specific details disclosed herein can be made, resulting in other embodiments that are within the scope of the invention disclosed. All parameters, dimensions, materials, quantities and configurations described herein are examples only and actual values of such depend on the specific embodiment. Accordingly, the scope of the invention is to be construed in accordance with the substance defined by the following claims.

The invention claimed is:

1. An unmanned aerial vehicle (UAV) comprising:
    a rotor arm assembly comprising:
        a rotor arm having an inner end region and an outer end region;
        a first connector mounted to the inner end region of the rotor arm;
        a second connector on an airframe of the UAV, wherein the first connector is configured to mate and unmate with the second connector;
        visual markings on the rotor arm and the airframe of the UAV configured to assist alignment of the rotor arm with the airframe of the UAV; and
    a fitting on the airframe of the UAV being configured to removably retain the rotor arm assembly on the airframe, the fitting comprising:
        a guide assembly coupled to the airframe of the UAV via at least one C-Shaped cradle in the airframe of the UAV and configured to direct the rotor arm towards the second connector;
        a connector assembly comprising the second connector, wherein the connector assembly is aligned with the guide assembly; and
        a clamp to retain the rotor arm assembly in position when the first and second connectors are mated.

2. The UAV according to claim 1, wherein the guide assembly comprises a split guide tube and the clamp presses the guide tube around the rotor arm to retain the rotor arm in position.

3. The UAV according to claim 1, wherein the rotor arm assembly further comprises:
    a motor mounted on the outer end region of the rotor arm;
    a rotor attached to the motor; and
    a landing gear;
    wherein the motor is electrically connected to the first connector.

4. The UAV according to claim 1, wherein the second connector comprises an electrical pin and a protrusion, wherein said first connector comprises a corresponding electrical socket configured to mate and unmate with the electrical pin on the second connector and a corresponding recess configured to accept the protrusion on the second connector, wherein the protrusion is configured to prevent mating of the first and second connectors unless the first and second connectors are in a correct orientation with respect to each other.

5. The UAV according to claim 3, wherein the protrusion protrudes further from the second connector than the electrical pin and has a larger cross-sectional dimension than a cross-sectional dimension of the electrical pin.

6. The UAV according to claim 4, wherein the recess and protrusion form a guide to facilitate proper electrical connection when the first and second connectors are mated.

7. The UAV according to claim 1, wherein the visual markings on the rotor arm assembly further comprises a visual indicator that corresponds the visual markings on the airframe of the UAV.

8. The UAV according to claim 1, further comprising a light emitting diode configured to illuminate when the rotor arm is mated in the correct orientation to the airframe of the UAV.

* * * * *